July 2, 1968   D. E. BOLGER ET AL   3,391,017
FORMATION OF ALUMINUM, GALLIUM, ARSENIC, AND
PHOSPHOROUS BINARY COATINGS
Filed Aug. 4, 1964   2 Sheets-Sheet 1
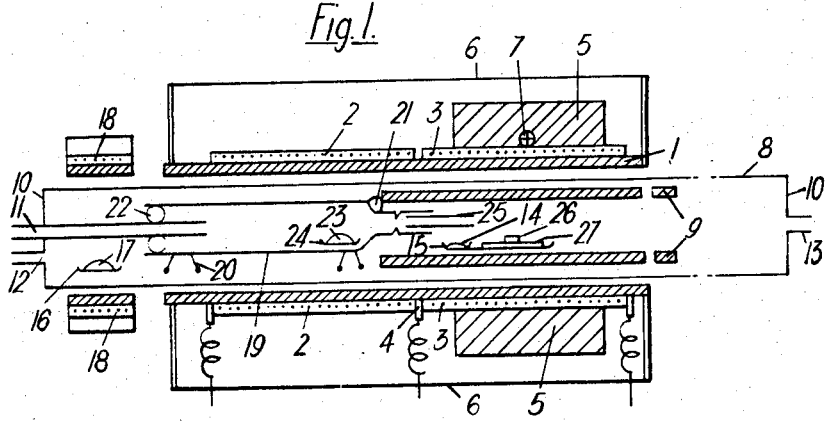
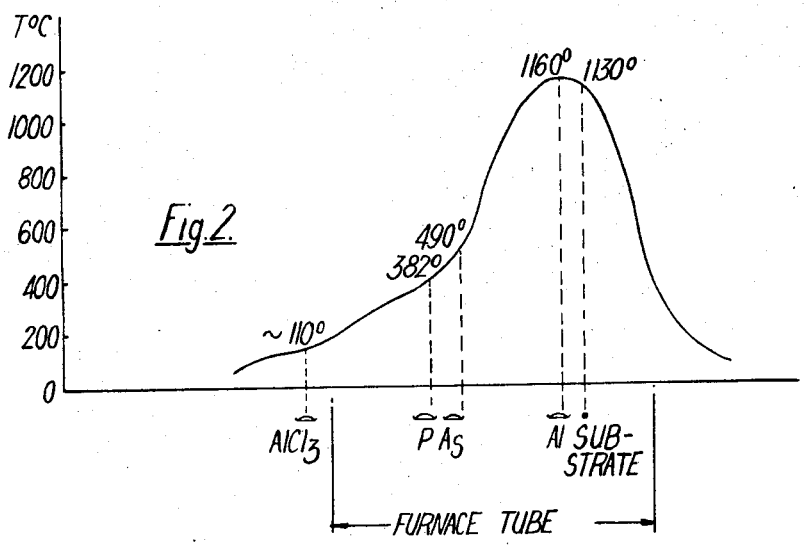
Inventors
DEREK E. BOLGER
BRYAN E. BARRY
By Philip M Bolton
Attorney

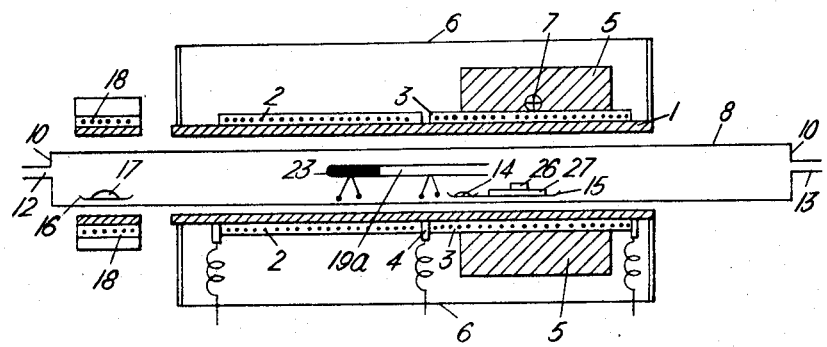
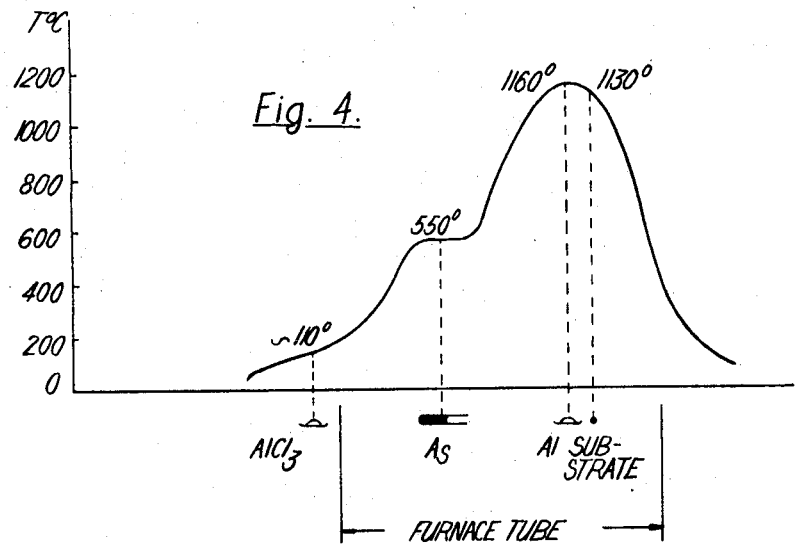

United States Patent Office 3,391,017
Patented July 2, 1968

3,391,017
FORMATION OF ALUMINUM, GALLIUM, ARSENIC, AND PHOSPHOROUS BINARY COATINGS
Derek Edwin Bolger and Bryan Edward Barry, London, England, assignors to International Standard Electric Corporation, New York, N.Y., a corporation of Delaware
Filed Aug. 4, 1964, Ser. No. 387,330
Claims priority, application Great Britain, Aug. 26, 1963, 33,753/63
8 Claims. (Cl. 117—106)

ABSTRACT OF THE DISCLOSURE

A method of manufacturing a compound selected from the group comprising $AlAs_xP_{1-x}$, $Ga_xAl_{1-x}P$ and $Ga_xAl_{1-x}As$, $x$ being a number ranging from 0 to 1, which method includes the step of combining at a remote compound growing point aluminium with vaporized arsenic and phosphorous in proportions determined by the value of $x$. The aluminium in the form of an unstable compound is transported to said remote growing point where said unstable compound disproportionates into a stable aluminium compound and free aluminium. The free aluminium then combines with the vaporized arsenic and phosphorous to form the desired compound.

---

This invention relates to the manufacture of aluminium compounds, and particularly to the manufacture of aluminium arsenide phosphide ($AlAs_xP_{1-x}$), gallium aluminium arsenide ($Ga_xAl_{1-x}As$) and gallium aluminium phosphide ($Ga_xAl_{1-x}P$), where $x$ is any number between 0 and 1.

$AlAs_xP_{1-x}$ belong to the group of semiconducting compounds which includes the well known materials indium antimonide, gallium arsenide and gallium phosphide. They are difficult to prepare in a sufficiently high state of purity for semiconductor device work by the standard procedures of growth from the melt because of their high melting points, (c. 1700° C.) their high decomposition pressures at their melting points, and the extreme reactivity of liquid aluminium at high temperatures which causes it to react with all known boat or crucible materials with the possible exception of very pure boron nitride. Thus any attempt to prepare these compounds from the melt results in heavy contamination from the crucible.

According to the broadest aspect of the invention there is provided a method of manufacturing a compound selected from the group comprising $AlAs_xP_{1-x}$, $Ga_xAl_{1-x}As$ and $Ga_xAl_{1-x}P$, which method includes the step of combining aluminium with arsenic and/or phosphorous in the vapour phase.

According to a more restricted aspect of the invention there is provided a method of manufacturing a compound selected from the group comprising $$AlAs_xP_{1-x},\ Ga_xAl_{1-x}As\ and\ Ga_xAl_{1-x}P$$

in which elemental arsenic and/or phosphorous are/is vaporised and the arsenic and/or phosphorous vapour is flowed by a carrier gas into a reaction zone, in which the vapour of a stable volatile aluminium compound is flowed by a carrier gas over molten aluminium at a temperature such as to cause the formation of an unstable volatile aluminium compound and into said reaction zone, and in which said reaction zone is at a temperature such as to cause disproportionation of said unstable aluminium compound into said stable aluminium compound and elemental aluminium.

Disproportionation is defined as a chemical reaction consisting in conversion of two or more like molecules or ions into two or more unlike molecules or ions (Encyclopaedic Dictionary of Physics, vol. 2, J. Thewlis, Pergamon Press, 1961).

In the process to be described the formation of the above compounds take place in the vapour phase, well away from the boat, thus eliminating much of the contamination. Although aluminium is melted in an alumina boat with which it will react slowly, the temperature involved is about 1100–1200° C., much lower than in the melt process, and the aluminium is transported in the vapour phase leaving all non-volatile impurities behind in the boat. Volatile impurities will be transported and will be taken up in the growing crystals to a greater or lesser extent depending on wellknown concepts of crystal growth. The level of such impurities may be much reduced by careful selection of apparatus and starting materials.

Aluminium is transported by the reversible reaction, $$2Al + AlCl_3 \rightleftharpoons 3AlCl$$

At 1115° C., 13% of the monochloride is present in the vapour. As the vapour is carried along by a suitable carrier gas into a region of lower temperature so the monochloride will disproportionate and aluminium will be reformed. If arsenic or phosphorous are present in the vapour, they will combine with the aluminium. This is the basis of the process.

Two embodiments of the invention will now be described with reference to the accompanying drawings, in which:

FIG. 1 is a schematic view of a furnace assembly for the preparation of the compounds, FIG. 2 is a temperature profile at various points along the furnace assembly of FIG. 1, FIG. 3 is a schematic view of another form of furnace assembly for the preparation of the compounds, FIG. 4 is a temperature profile at various points along the furnace assembly of FIG. 3.

The process will be described as it applies to aluminium arsenide. Changes to be made for the preparation of the other compounds will be described later.

Referring to FIG. 1, the furnace consists of an aluminous porcelain tube 1 of 40 mm. bore and 600 mm. length, wound externally with two sets of heater windings 2 and 3, with a centre tap 4 to enable one set of windings, 2, to be shorted out or shunted with a suitable resistance. This facility, together with porous firebricks 5 which provide thermal insulation to the hot end of the furnace, provides a method of obtaining the desired temperature profile (FIG. 2). The assembly is enclosed in a cylindrical aluminium casing 6.

Two Pt-Pt/13% Rh thermocouples 7 lie with their heads in close proximity to the furnace windings 3 at the hottest point. One thermocouple is connected to a millivolt recorder, and the other to a temperature controller capable of regulating the temperature of the furnace to better than ±1° C.

A reaction tube 8 is of fused silica or impervious pure alumina, bore approx. 35 mm. If the former is used, it is necessary to protect it against attack by aluminium monochloride by the use of an inner tube 9 of pure alumina inside which all the reactions take place. The ends of the reaction tube are closed by brass, plated brass or stainless steel end-caps 10, sealed by neoprene O-rings (not shown). Entrance pipes 11 and 12 and an exit pipe 13 for the carrier gas are provided.

Pure aluminium 14 is placed in an alumina boat 15 at the hottest part of the furnace. Another alumina boat 16 containing pure, resublimed aluminium trichloride 17 is placed just outside the main furnace 1, and is heated by a subsidiary heater 18, which is independently controlled.

If arsenic was placed in the tube 8 so that its vapour passed directly over the surface of the aluminium 14, it would merely dissolve in the metal, and little or no vapour transport would take place. Aluminium arsenide would simply be formed in the melt, and would separate out on freezing. Thus it is necessary to separate the arsenic vapour stream from that carrying aluminium monochloride until a point beyond that where the aluminium containing boat 15 is situated.

This is achieved by the arrangement shown in FIG. 1. A separate, fused silica, carrier gas inlet tube 11 leads to a wider fused silica tube 19 through a silica wool plug 22, which allows easy dismantling. The tube 19 on supporting legs 20 is inserted in the reaction tube 8 until a stop 21 on the tube 19 bears against the end of the inner tube 9.

Arsenic metal 23 is placed in an alumina boat 24 at a suitable position inside the tube 19 such that its vapour pressure is a convenient value when the furnace is at operating temperature. Exit from the tube 19 is via a pure alumina tube 25 of about 6 mm. bore, which is a close fit in the outlet of the silica tube 19 and which carries the arsenic vapour into the hot zone beyond the boat 15 containing the aluminium. The second inlet tube 12 leads the carrier gas over the aluminium chloride 17 and the aluminium 14. By an arrangement of taps and flowmeters, the carrier gas flow ratio between the two inlet tubes 11 and 12 may be varied at will.

The carrier gas normally used is hydrogen, although any neutral or inert gas can be used.

When a substrate 26 is to be used for obtaining epitaxial deposition, it is placed on a small alumina platform 27 downstream of the end of the alumina tube 25 which leads in the arsenic vapour. To simplify loading and positioning, the platform is placed in the 10 cm. long alumina boat 15 which also incorporates the container for the molten aluminium 14 at one end.

In the alternative furnace assembly shown in FIG. 3, in which like reference numerals have been used for like components already shown in FIG. 1, there are two major differences to the furnace shown in FIG. 1.

The reaction tube 8 of FIG. 3 is of impervious pure alumina, and the arsenic 23 is contained within an impervious pure alumina tube 19a with one end closed in the upstream direction and extending downstream beyond the aluminium 14. It will be seen that the tube 19a replaces the silica tube 19 of FIG. 1 with its own entrance pipe 11, and accordingly there is only the single entrance pipe 12 in FIG. 3.

The importance of using only pure, impervious alumina in the hot zone where aluminium monochloride is present must be emphasized. Most other materials, particularly silica, will react to give contaminating volatile compounds. The only other material which might be non-contaminating is vitreous carbon.

The operating procedure is as follows: the reaction tube 8 and all the pieces which go inside are cleaned in aqua regia, rinsed, and thoroughly dried. The apparatus is then set up as in FIG. 1 or FIG. 3 and the reaction tube 8 is evacuated. Hydrogen is then fed through tubes 11 and 12 (for FIG. 1) or tube 12 (for FIG. 3) and the furnace is heated by passing current through both coils 2 and 3.

This allows the arsenic 23 to heat up first and provide a protective atmosphere for the substrate 26, inhibiting arsenic evaporation from the surface. After a suitable period of time, coil 2 is shorted out, this causing a corresponding increase in current through coil 3, bringing the apparatus quickly to its control temperature. The subsidiary heater 18 is now warmed up to vaporize the aluminium chloride 17. This arrangement produces the temperature profile shown in FIG. 2 for the apparatus of FIG. 1, and in FIG. 4 for the apparatus of FIG. 3.

Deposition is arbitrarily assumed to start when the aluminium chloride heater temperature reaches 105° C., measured with a mercury-in-glass thermometer between the heater 18 and the reaction tube 8. When a fused silica tube is used, $AlCl_3$ may be seen subliming onto the tube at this temperature. To terminate the run, the heater 18 is removed, and a 10-minute interval allowed to clear the chloride vapour. The main furnace is then cooled slowly with coil 2 back in circuit to maintain the arsenic pressure while the substrate 26 is still hot.

Typical temperatures and flow rates used are as follows: aluminium 1150–1160° C., arsenic 490° C.–550° C., aluminium chloride 110° C., hydrogen flow rate over arsenic 250 ml./min., over aluminium 125 ml./min., position of substrate about 4–5 cm. downsteram of the aluminium and some 30° cooler. The temperatures are not very critical, over the ranges tried: (1100–1160° for the aluminium temperature, 375–750 ml./min. for the total gas flow rate). It is important however, to maintain an excess of arsenic to prevent deposition of free aluminium. The temperatures given represent about 50 mm. partial pressure of arsenic and 3 mm. partial pressure of aluminium chloride. In a typical run, the epitaxial deposit grows at the rate of about $0.4$–$0.5\mu$/minute on the four principal crystallographic planes of gallium arsenide (i.e. $(111), (\bar{1}\bar{1}\bar{1}) (\bar{1}10) (100)$).

The substrate 26 is normally a slice of melt-grown gallium arsenide, which has been lapped, chemically etched and vapour washed over boiling methanol before use. Good single crystal deposits of aluminium arsenide have been grown on $(111)$ $(\bar{1}\bar{1}\bar{1})$, $(110)$ and $(100)$ surface of gallium arsenide and also on previously-grown epitaxial surfaces of aluminium arsenide. In addition, needle-like crystals of aluminium arsenide grow around the exit end of the alumina tube 25 during the run.

If the grown layer is thick enough, then the gallium arsenide substrate 26 may be removed by lapping and polishing under kerosene to leave a wafer of single crystal aluminium arsenide. For example, single crystals 1 cm.² in area and $150\mu$ thick have been prepared in this way and used to obtain electrical data indicative of the level of purity. Typical results obtained by Hall effect measurements are:

Conductivity type—N.
  Resistivity—0.1–0.01 ohm-cm.
  Free carrier concentration—$3.10^{17}$–$1.10^{18}$/cm.³
  Mobility of carriers—100–200 cm.²/volt-second.

Most of the above applies also to the preparation of aluminium phosphide. When arsenic is replaced in the system by red phosphorus, aluminium phosphide may be prepared. A range of phosphorus temperatures up to 382° C. (partial pressure ~300 mm.) has been tried. Free-growing yellow-green needles of the phosphide are formed, and epitaxial growth has been obtained on a silicon substrate. Silicon is substituted as a substrate in place of gallium arsenide because its lattice constant, 5.43 A., is closer to that of aluminium phosphide (which is 5.45 A.).

Hall effect measurements on aluminium phosphide prepared in this way are:

Conductivity type—N.
  Resistivity—0.005 ohm.-cm.
  Free carrier concentration—$2 \times 10^{19}$/cm.³
  Mobility of carriers—100 cm.²/volt-second.

Preparation of the compound $AlAs_xP_{1-x}$ is by including a source in the reaction tube 8 of both arsenic and phosphorus.

For making the compounds $Ga_xAl_{1-x}As$ and $Ga_xAl_{1-x}P$, gallium metal is placed in the system and use is made of the reaction

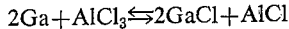

$$2Ga + AlCl_3 \rightleftharpoons 2GaCl + AlCl$$

to obtain vapour phase gallium transport in addition to that of aluminium which occurs under the same conditions as already described.

During the preparation of any of the above compounds, doping of the material can be carried out in known manner using volatile halides of suitable elements.

It is understood that the foregoing description of specific examples of this invention is made by way of example only and is not to be considered as a limitation on its scope.

What we claim is:

1. A method of manufacturing $AlAs_xP_{1-x}$, $x$ being a number ranging from zero to one, which method includes the steps of:

vaporizing arsenic and phosphorus, flowing a stream of said vaporized arsenic and phosphorus by a carrier gas into a reaction zone;

vaporizing aluminium trichloride, flowing a stream of said vaporized aluminium trichloride by a carrier gas over a molten aluminium, said molten aluminium being at a temperature of about 1100° C. to about 1200° C.;

producing an unstable lower order aluminium halide from the reaction of said aluminium trichloride with said molten aluminium;

flowing a stream of said lower order halide by a carrier gas into said reaction zone, said stream of lower order halide being separated from said stream of vaporized arsenic and phosphorus until a point beyond where said molten aluminium is situated;

said reaction zone being about 30° C. in temperature cooler than said molten aluminium causing said lower order halide to disproportionate into aluminium trichloride and free aluminium;

combining said free aluminium with said vaporized arsenic and phosphorus in proportions determined by the value of $x$; and depositing said compound onto a substrate in said reaction zone.

2. A method of manufacturing $AlAs_xP_{1-x}$, $x$ being a number ranging from zero to one, which method includes the steps of:

vaporizing arsenic and phosphorus, flowing a stream of said vaporized arsenic and phosphorus by a carrier gas into a reaction zone;

vaporizing aluminium trichloride, flowing a stream of said vaporized aluminium trichloride by a carrier gas over a molten aluminium, said molten aluminium being at a temperature of about 1100° C. to about 1200° C.;

producing an unstable lower order aluminium halide from the reaction of said aluminium trichloride with said molten aluminium;

flowing a stream of said lower order halide by a carrier gas into said reaction zone;

said reaction zone being about 30° C. in temperature cooler than said molten aluminium causing said lower order halide to disproportionate into aluminium trichloride and free aluminium;

combining said free aluminium with said vaporized arsenic and phosphorus in proportions determined by the value of $x$; and collecting said compound in said reaction zone.

3. A method of manufacturing $AlAs_xP_{1-x}$, $x$ being a number ranging from zero to one, which method includes the steps of:

vaporizing arsenic and phosphorus, flowing a stream of said vaporized arsenic and phosphorus by a carrier gas into a reaction zone;

vaporizing aluminium trichloride, flowing a stream of said vaporized aluminium trichloride by a carrier gas over molten aluminium;

producing an unstable lower order aluminium halide from the reaction of said aluminium trichloride with said molten aluminium;

flowing a stream of said lower order halide by a carrier gas into said reaction zone;

disproportionating said lower order halide into aluminium trichloride and free aluminium;

combining said free aluminium with said vaporized arsenic and phosphorous in proportions determined by the value of $x$; and collecting said compound in said reaction zone.

4. A method as claimed in claim 3 in which said carrier gas is hydrogen.

5. A method as claimed in claim 3 in which two separate streams of carrier gas are used, in which the elemental arsenic phosphorus are contained in an open container over which is flowed the first stream of said carrier gas, and in which said stable aluminium trichloride and said molten aluminium are each contained in additional open containers over which is flowed the second stream of said carrier gas.

6. A method as claimed in claim 3 in which a single stream of carrier gas is used, in which said stable aluminium trichloride and said molten aluminium are each contained in open containers over which said stream is flowed, and in which the elemental arsenic phosphorus are contained in a tube closed at one end and open at the other end with the closed end extending upstream into said carrier gas stream and the open end extending beyond the container containing the molten aluminium.

7. A method of manufacturing $Ga_xAl_{1-x}As$, $x$ being a number ranging from 0 to 1, which method includes the steps of:

vaporizing arsenic, flowing a stream of said vaporized arsenic by a carrier gas into a reaction zone;

vaporizing aluminium trichloride, flowing a stream of said vaporized aluminium trichloride by a carrier gas over molten aluminium and molten gallium;

producing an unstable lower order aluminium halide from the reaction of said aluminium trichloride with said molten aluminium;

producing an unstable gallium halide from the reaction of said aluminium trichloride with said molten gallium;

flowing a stream of said lower order aluminium halide and said gallium halide by a carrier gas into said reaction zone;

disproportionating said lower order aluminium halide into aluminium trichloride and free aluminium;

disproportionating said gallium halide into aluminium trichloride and free gallium;

combining said free aluminium and gallium with said vaporized arsenic in proportions determined by the value of $x$;

and collecting said compounds in said reaction zone.

8. A method of manufacturing $Ga_xAl_{1-x}P$, $x$ being a number ranging from 0 to 1, which method includes the steps of:

vaporizing phosphorous, flowing a stream of said vaporized phosphorous by a carrier gas into a reaction zone;

vaporizing aluminium trichloride, flowing a stream of said vaporized aluminium trichloride by a carrier gas over molten aluminium and molten gallium;

producing an unstable lower order aluminium halide from the reaction of said aluminium trichloride with said molten aluminium;

producing an unstable gallium halide from the reaction of said aluminium trichloride with said molten gallium;

flowing a stream of said lower order aluminium halide and said gallium halide by a carrier gas into said reaction zone;

disproportionating said lower order aluminium halide into aluminium trichloride and free aluminium;

disproportionating said gallium halide into aluminium trichloride and free gallium;

combining said free aluminium and gallium with said vaporized phosphorous in proportions determined by the value of $x$;

and collecting said compounds in said reaction zone.

References Cited

UNITED STATES PATENTS

| | | | |
|---|---|---|---|
| 2,184,705 | 12/1939 | Willmore | 75—68 |
| 3,094,388 | 6/1963 | Johnson et al. | 23—204 |
| 3,145,125 | 8/1964 | Lyons | 117—106 |
| 3,218,205 | 11/1965 | Ruehrwein | 117—106 |
| 3,231,337 | 1/1966 | Barkemeyer | 23—204 X |

ALFRED L. LEAVITT, *Primary Examiner.*

A. GOLIAN, *Assistant Examiner.*